(12) United States Patent
Otterness et al.

(10) Patent No.: US 6,654,831 B1
(45) Date of Patent: Nov. 25, 2003

(54) USING MULTIPLE CONTROLLERS TOGETHER TO CREATE DATA SPANS

(75) Inventors: Noel S. Otterness, Boulder, CO (US); Joseph G. Skazinski, Berthoud, CO (US)

(73) Assignee: International Business Machine Corporation, Armonk, NY (US)

( * ) Notice: Subject to any disclaimer, the term of this patent is extended or adjusted under 35 U.S.C. 154(b) by 0 days.

(21) Appl. No.: 09/519,949

(22) Filed: Mar. 7, 2000

(51) Int. Cl.$^7$ .............................................. G06F 13/12
(52) U.S. Cl. .......................... 710/74; 709/105; 711/114
(58) Field of Search .............................. 710/74, 14, 11; 709/105; 711/112, 114; 714/5

(56) References Cited

U.S. PATENT DOCUMENTS

| | | | | |
|---|---|---|---|---|
| 5,802,394 A | * | 9/1998 | Baird et al. ..................... | 710/5 |
| 6,292,878 B1 | * | 9/2001 | Morioka et al. ............ | 711/209 |
| 6,385,673 B1 | * | 5/2002 | DeMoney ..................... | 710/60 |
| 6,408,400 B2 | * | 6/2002 | Taketa et al. .................. | 714/5 |
| 6,425,049 B1 | * | 7/2002 | Yamamoto et al. ......... | 711/112 |

* cited by examiner

Primary Examiner—Kim Huynh
Assistant Examiner—Harold Kim

(74) Attorney, Agent, or Firm—Dorsey & Whitney LLP

(57) ABSTRACT

A data storage system includes a pluralierty of controllers in a master/slave N-way controller topology. The master controller is coupled to a host system, and each controller is operatively coupled to one of a plurality of data unit arrays. The plurality of data unit arrays each include a plurality of disk units that are linked together. The linked disk units appear as a continuous logical unit and each data unit array forms a data span, such that the plurality of data unit arrays form N-way data spans. Each controller is adapted to transfer data between the data units and the master controller in response to instructions therefrom based on a data configuration. The data is then transferred between the master controller and the host system. The master controller is adapted to balance I/O requests amongst the plurality of controllers and re-direct an I/O request directed to a failed controller to an active controller. Alternatively, the data storage system 300 includes a plurality of controllers in a peer-to-peer N-way controller topology. Any one active controller is adapted to transfer data between the data units and the host system in response to instructions therefrom and balance I/O requests amongst the plurality of controllers and re-direct an I/O request directed to a failed controller to an active controller. Advantages include automatic copying of the host data to an alternate controller for data protection. In addition, if the spans are setup as a RAID 0+5 or some other similar configuration, the workload is automatically distributed among the various controllers.

35 Claims, 10 Drawing Sheets

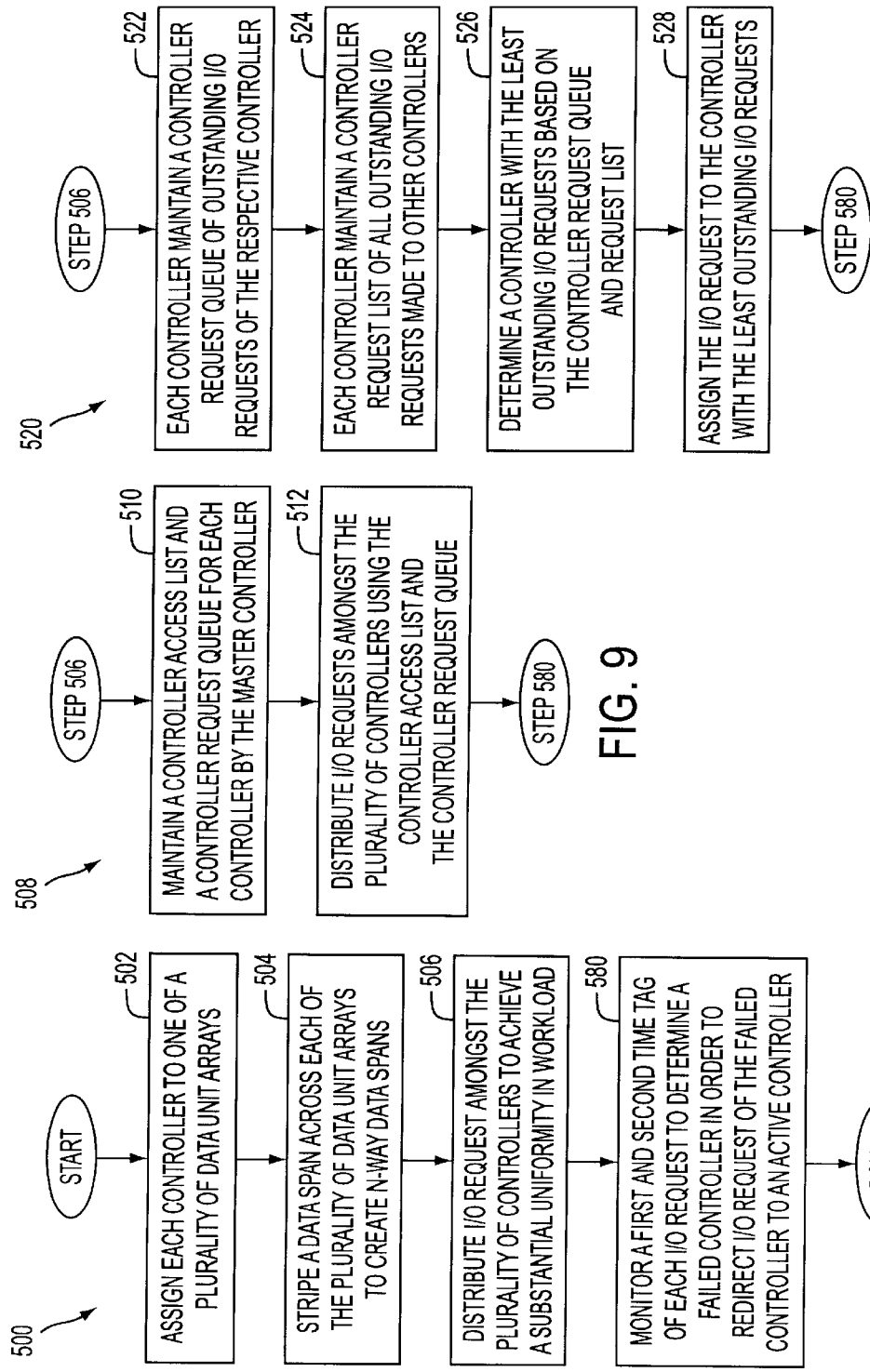

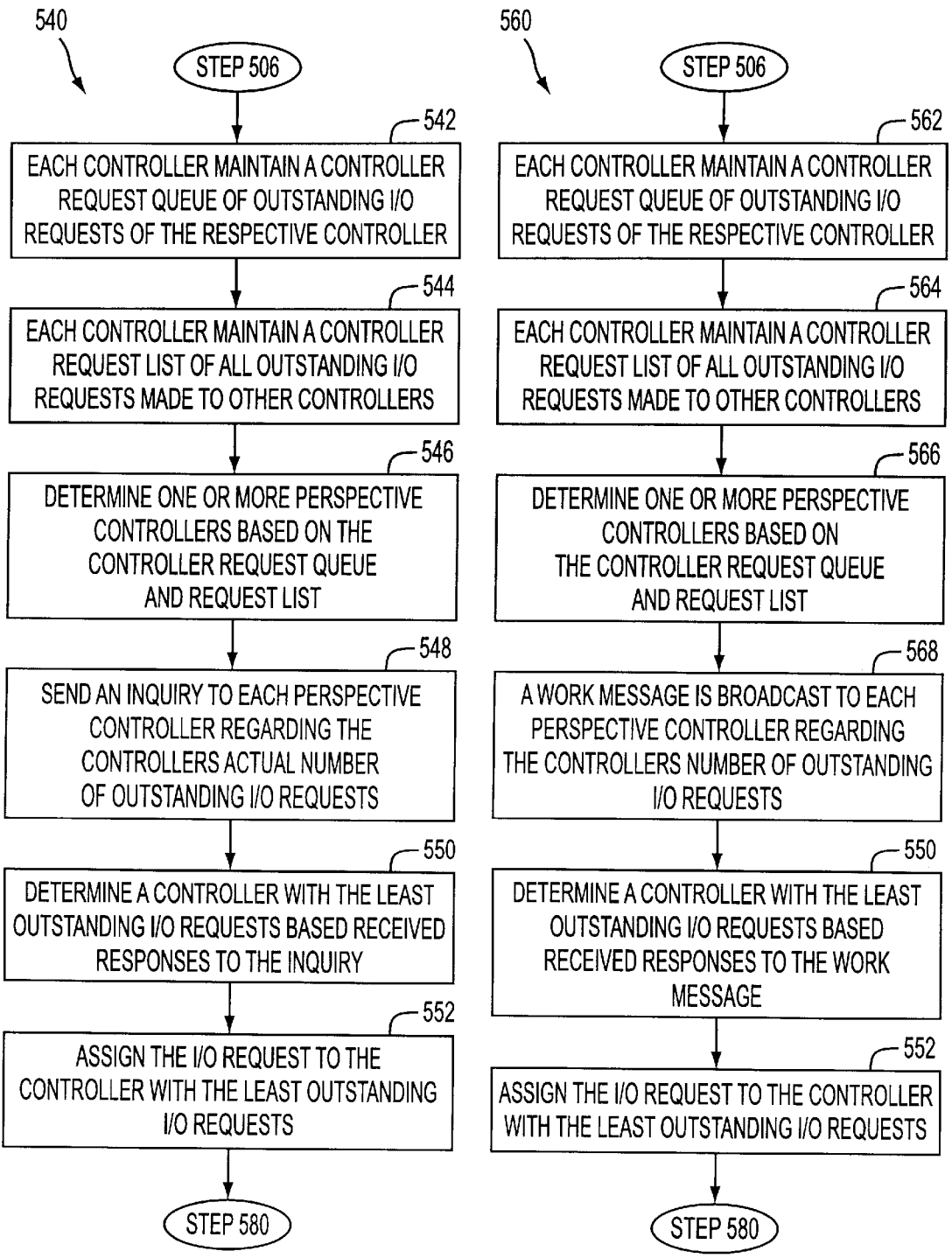

USING MULTIPLE CONTROLLERS TOGETHER TO CREATE DATA SPANS

FIELD OF THE INVENTION

The present invention relates to a data storage system. More particularly, the present invention relates to a data storage system using a plurality of controllers together with a plurality of data unit arrays to create N-way data spans.

BACKGROUND OF THE INVENTION

FIG. 1A depicts a data storage system 100 utilizing a single controller 106 as known in the art. The controller 106 is, for example, similar to the FFX controller architecture made by Mylex™ of Fremont, Calif. This controller 100 provides two disk channels (118 and 128) for connecting with two fibre disk loops (102 and 104) and one host channel 130 for communications with the host system. Having an additional disk channel 104 provides additional physical drive capacity to the data storage system 100. However, the controller 106, even with the additional disk channel 104 is unable to fully utilize the bandwidth provided by the host system 108.

Looking at FIG. 1A from a workload allocation and distribution standpoint for a redundant array of independent disks (RAID) write operation, the workload is as follows. Assuming a host channel 130 and the two disk channels have a bandwidth, X, the controller 106 can sustain a maximum back end bandwidth of ½(X). The is due to the fact that a host write generates four-time the back end traffic in a RAID 5 system. The controller 106 reads old data and old parity to perform a RAID 5 write, requiring two read across the disk channel, for example 102. The write operation then consists of writing the new parity data and the host write data to a drive, for example 110, requiring two writes across the disk channel 102, thereby resulting in four I/O operations across the disk channel 102. Contrary to a controller having a single disk channel which can sustain a maximum host bandwidth of ¼(X), the additional disk channel 104 allows the controller to increase the back end bandwidth ½(X). The single controller is unable fully utilize the host channel bandwidth.

Dual active controllers were implemented to circumvent a single point of failure problem that all known single active controllers, for example as depicted in FIG. 1A, exhibit. Dual active controllers are two controllers working together to provide a greater level of fault tolerance. Typically, each controller is connected to the other controller through a special communications channel as a means of detecting whether the alternate controller has malfunctioned or failed. In the event the alternate controller fails or malfunctions, the alternate controller is held in a state that allows it no interactions with the host system, and the surviving controller assumes all of the responsibilities of the alternate controller.

Dual active controllers provide two channels (158 and 160) of communications with the host system and thus provides faster servicing of host data requests. Also, each controller (152 and 154) works together with the other controller (152 and 154) to ensure that all cached data requests are safe in the event of a controller failure. The dual active controller architecture 150 depicted in FIG. 1B, provides greater fault tolerance by handling any single controller (106 and 108) failure. In addition, the setup of this type of dual active controller architecture 150 is still very similar to the single controller setup (FIG. 1A) in that each controller works independently and does not distribute the work between the controllers. As a result, these types of configurations do not provide any load balancing.

However, the dual active controller architecture depicted in FIG. 1 suffers from several limitations. One limitation is that a single controller has a captive array of drives, usually the number of drives available in a single drive enclosure. Although enclosures (and the devices they contain) can be daisy chained together to provide more physical drive capacity, this does not address or provide any solution to the problems of controller redundancy or increased processing power. Adding additional disk storage subsystems, which still work independently, provides additional storage, but does not in itself add additional processing or data handling capabilities.

A further limitation associated with the dual active controller architecture 150 depicted in FIG. 1B is its lack of expandability. Traditionally, expanability is accomplished by providing an additional controller and a set of associated drives to a data storage system. The ideal situation would be to expand the capacity of the system drive to include the new physical drives in order to take advantage of the additional processing power provided by the new controller rather than merely using the added controller to support only the added drives.

Therefore, there remains a need to overcome the above described limitations in the existing art as well as other limitations, which are satisfied by the inventive structure and method described hereinafter.

SUMMARY OF THE INVENTION

The present invention overcomes the identified problems by providing a data storage system in which multiple controllers are used in an N-way configuration to create N-way data spans. An exemplary embodiment of the data storage system includes a plurality of controllers including at least one master controller in a master/slave N-way controller topology. The master controller is coupled to a host system via a communications loop, and each controller is operatively coupled to one of a plurality of data unit arrays. The plurality of data unit arrays each include a plurality of disk units that are linked together. The linked disk units appear as a continuous logical unit and each data unit array forms a data span, such that the plurality of data unit arrays form N-way data spans. Each controller is adapted to transfer data between the data units and the master controller in response to instructions therefrom based on a data configuration. The data is then transferred between the master controller and the host system. In addition, the master controller is adapted to balance input/output (I/O) requests amongst the plurality of controllers and re-direct an I/O request directed to a failed or malfunctioning controller to an active controller. Together, the plurality of controllers and the plurality of data unit arrays appear as a continuous system drive to the host system.

In a further embodiment, the data storage system includes a plurality of controllers in a peer-to-peer N-way controller topology. A peer-to-peer topology allows any one active controller to take over the functions of a failed or malfunctioning controller without any interruption to the host system or data loss. The plurality of controllers are each coupled to the host system via a communications loop and operatively coupled to each of a plurality of data unit arrays. Any one active controller is adapted to transfer data between the data units and the host system in response to instructions therefrom based on a data configuration. In addition, any one active controller is adapted to balance I/O requests amongst the plurality of controllers and re-direct an I/O request directed to a failed controller to an active controller. Together, the plurality of controllers and the plurality of data unit arrays appears as a continuous system drive to the host system. Alternatively, a master controller is added to the peer-to-peer N-way controller topology to create a hybrid (master/slave and peer-to-peer) controller topology.

Advantages of the invention include automatic copying of the host data to an alternate controller for data protection. In addition, if the spans are setup as a RAID level 0+5 or some other similar configuration, the workload is automatically distributed among the various controllers. (RAID 0+5 refers to a multiple RAID configuration in which data is transferred to the master or any one active controller in a RAID 0 format and written to the data units in a RAID 5 configuration.)

BRIEF DESCRIPTION OF THE DRAWINGS

Additional advantages and features of the invention will become readily apparent upon reading the following detailed description and appended claims when taken in conjunction with reference to the following drawings, in which:

FIG. 8 depicts a procedure for using a plurality of controllers together with a plurality of data unit arrays in a data storage system to create n-way data spans according to a first embodiment of the invention;

FIG. 9 depicts additional procedural method steps for distributing I/O requests amongst the plurality of controllers according to a further embodiment of the invention;

FIG. 10 depicts additional procedural method steps for distributing I/O requests amongst the plurality of controllers according to a further embodiment of the invention;

FIG. 11 depicts additional procedural method steps for distributing I/O requests amongst the plurality of controllers according to a further embodiment of the invention;

FIG. 12 depicts additional procedural method steps for distributing I/O requests amongst the plurality of controllers according to a further embodiment of the invention;

DETAILED DESCRIPTION

Figure 1A:
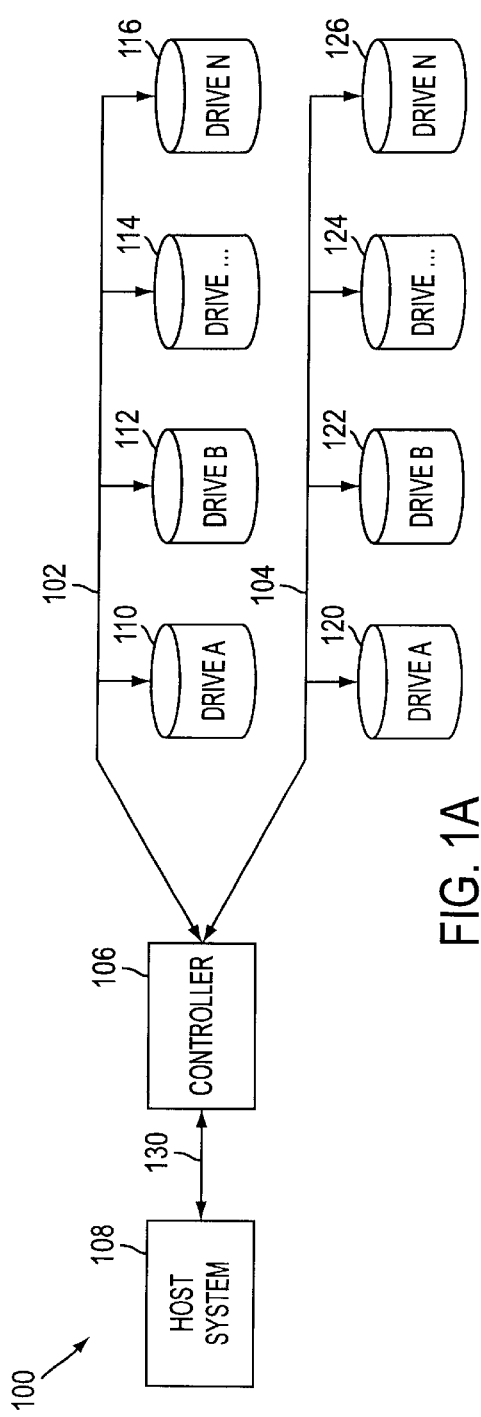
FIG. 1A depicts a controller as known in the art.
Figure 1B:
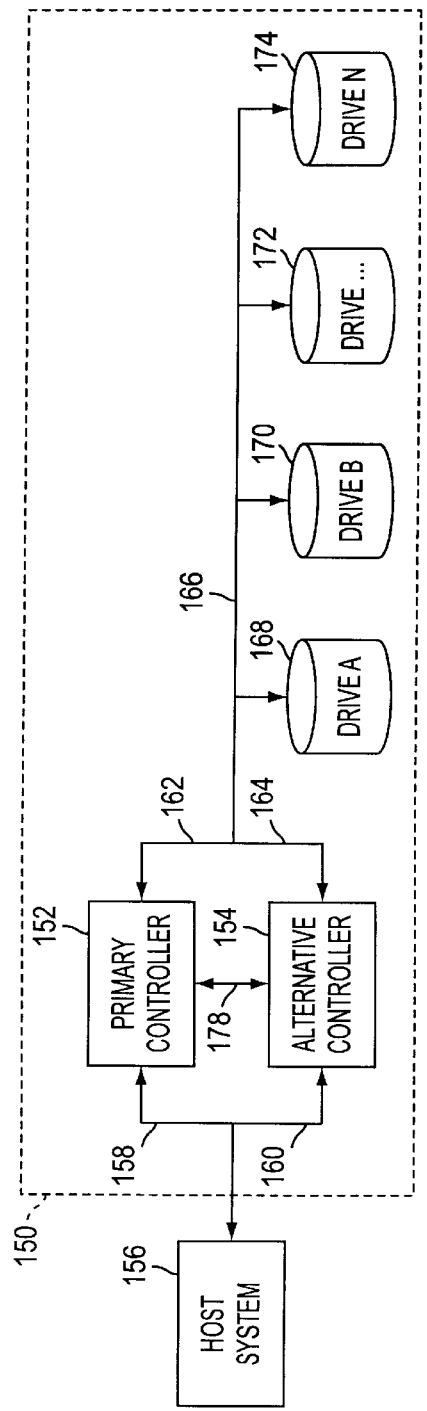
FIG. 1B depicts a dual active controller as known in the art.

The invention is now described in detail by way of illustrations and examples for purposes of clarity and understanding. Those skilled in the art will appreciate that various changes and modifications can be made while remaining within the scope of the claims. As described herein, a system drive is an internal nomenclature for a grouping of one or more physical drives. In general, a physical drive appears as a small computer system interface (SCSI) Logical Unit to a host system; however, the invention is not limited to such SCSI Logical Unit. A data span, as described herein, is the basic redundant array of independent disks (RAID) group or other distributed storage array, consisting of a number of disk or other type storage units which can be put together in an array to appear as a contiguous logical data storage space. In the event a RAID level of the span provides for redundancy, the span will have all the required information to rebuild a failed disk in that span. Consequently, multiple spans may be grouped together to provide a larger physical data space. Moreover, through having each span being a protected RAID level, a larger range of failures can be protected against. In addition, a data unit, as described herein, is a grouping of captive disk drives and a controller. These meanings are consistent with standard usage in the art and are not intended to limit such usage.

In order to expand the capacity of a system drive to include new physical drives and to take advantage of the additional processing power provided by the newly added controller, the first requirement is to have a method to redistribute data across the new spans and add in the additional capacity. This can be done through a Mylex Online RAID Expansion procedure referred to as "MORE" with some modifications. MORE is a technique that relays data on certain physical drives to any additional physical drives. A second requirement is to have operating systems which are capable of handling the size of a logical unit number (LUN) to which the configuration is being expanded. Providing this capability is left to the operating systems and is not be addressed in further detail here. However, the controllers can still initially be setup to distribute their processing capability without any special requirements or capabilities of the operating system. The final requirement is to provide a technique or procedure in which the newly added controller is used to increase the data movement capability of a data unit array.

A newly added controller increase s the data movement capability of a data unit array by having a single controller per span. Thus, a controller is responsible for performing write and read operations from a set of drives contained within the data unit arrays. The set of controllers and data unit arrays together constitute a system drive for a host system. A particular exemplary controller architecture for implementing the data spans is now described.

System Architecture

A first embodiment is described with reference to FIG. 2. A data storage system 200 using multiple controllers in a master/slave N-way controller topology is depicted. By N-way we mean N-controllers working together to improve host computer and system drive performance and fault tolerance. This means when N is greater than two the master controller 204 can explicitly direct a slave controller (202-1, 202-3, 202-4) as to what to do with a packet of data. In other words, one controller (the master controller 204) is chosen to "direct" the distribution of data amongst the other controllers (202-1, 202-3, 202-4) (the slave controllers). For read operations, the read request is forwarded to a slave controller, for example 202-1. The slave controller 202-1 will handle the read request and then forward the data 264 to the master controller 204 which then responds to the host system 250.

The system 200 includes a plurality of controllers 202 including at least one master controller 204. The master controller 204 is coupled to a host system 250 via a host loop 252, and each controller 202(202-1,202-2,202-3,202-4) is operatively coupled to one of a plurality of data unit arrays 254 (254-1, 254-2, 254-3, 254-4) via a communications loop 292. The plurality of data unit arrays 254 each include a plurality of hard disk drive units 256 (256-1, 256-2, 256-3, 256-4, 256-5) or other data storage units or devices that are linked together. The linked disk units 256 appear as a continuous logical unit and each data unit array forms a data span 258, such that the plurality of data unit arrays form N-way data spans 260. Here "N" refers to the number of continuous logical data storage spaces provided in the data storage system 200, where N is greater than two. Each controller 202 is adapted to transfer data 262 between the data unit arrays 254 and the master controller 204 in response to instructions therefrom and based on a data configuration. The data 262 is then transferred between the master controller 204 and the host system 250. In addition, the master controller 204 is adapted to balance I/O requests 270 amongst the plurality of controllers 202 and re-direct an I/O request 270 directed to a failed controller to an active controller. Together, the plurality of controllers 202 and the plurality of data unit arrays 254 appear as a continuous system drive to the host system 250.

Figure 2:
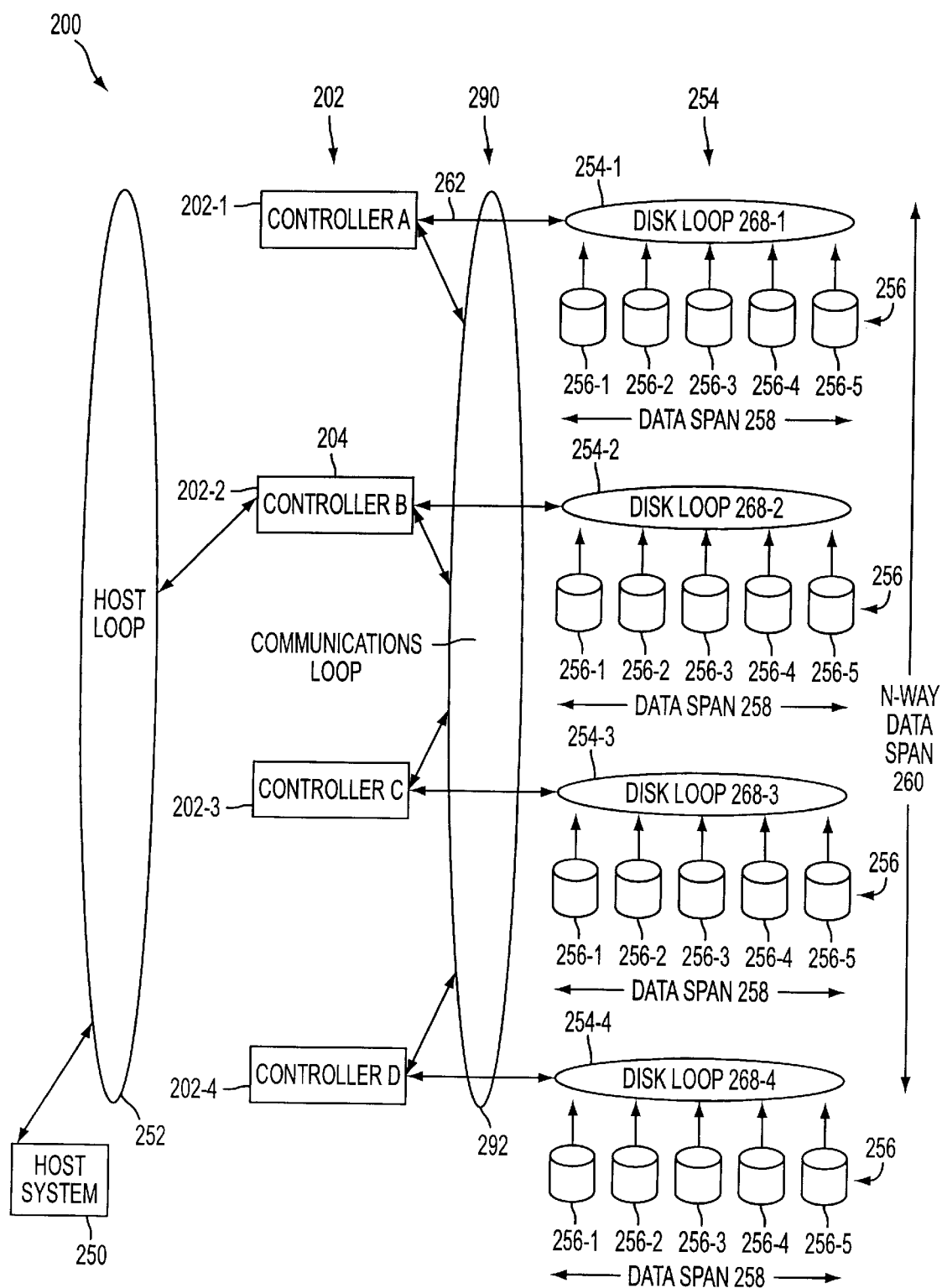
FIG. 2 depicts a data storage system according to a first embodiment of the invention.

As depicted in FIG. 2, the host system 250 communicates with the master controller 204 to perform reads and/or writes to a logical unit number (LUN). This is desirable since there is no current technique for distributing a LUN across multiple ports; however, this is not a limitation of the inventive structure or method itself. The master controller 204 is in charge of distributing I/O requests 270 to the slave controllers 202 (202-1, 202-3, 202-4) which are capable of handling the I/O request 270 based on the data configuration. In the case of a write operation, the master controller 204 will accept the data 262 from the host system 250 and copy it to a slave controller, for example 202-1, which is responsible for the span 258 for which the data 262 is intended. After the data 262 has been copied, the master controller 204 may return status back to the host system 250 if the LUN is write back. A write back LUN writes the data 262 to a cache before returning status to the host system 250. If the LUN is setup as a write through LUN, it must wait until the data 262 has been written by the slave controller. A write through LUN writes the data to a cache and the system drive before returning status to the host system 250.

For example, the write by the slave controller 202-1 may simply mean sending the data 252 to a data unit 256 in a RAID 0 configuration, or calculating the parity and writing both the parity and the data 252 to the proper data units 256 in a RAID 5 case. This strategy allows the master controller 204 to be used as either a host controller and partially as a disk controller, or to be used fully as a host controller, depending on the system configuration. In the exemplary four controller configuration of FIG. 2, for sequential write operations the master controller 204 is responsible for about one-fourth (¼) of the disk operations in the system 200, the total number of disk operations being divided amongst the four configured controllers 202. The linked disk units 256 are preferably linked by a daisy chain connection. A daisy chain is preferable because it facilitates communication by the data units across the disk loops but other connections such as out of band/direct connection may be used. In addition, each disk unit 256 includes a unit controller 266 and a plurality of data storage devices 268. A unit controller 266 is a disk controller that performs reads and writes to the disk drives and sends and receives commands from the other unit controllers. In one embodiment the data configuration is preferably a RAID 0+5 configuration. RAID 0+5 is used to denote one possible multiple level RAID configuration. In this configuration, the master or active controller 204 distributes data to the slave controllers (202-1, 202-3, 202-4) in a RAID 0 manner. The slave controllers 202 (202-1, 202-3, 202-4) write the data 262 to the data units 256 using a RAID 5 algorithm.

If we look at the configuration depicted in FIG. 2 from a workload allocation and distribution standpoint for a write operation, the math looks like the following:

N transfers of host data 262 are performed to the master controller 204 from the host system 250. N transfers of host data from the master controller 204 to the slave controllers 202. (This step is actually optional, but it is included to account for the assumption that this copy operation must always be performed to allow for data redundancy.)

Each controller 202 reads Old Data and Old Parity to perform the RAID 5 write. The write operation then consists of writing the New Parity Data and the New Data to the data units 256. Each controller 202 is assumed to receive N/4 host data 262 transfers from the master controller 204. The advantage of the N-way master/slave controller topology depicted in FIG. 2 is that each back-end disk loop 268 has only ¼N host traffic. This means that the disk loops 268 can be fully utilized to take advantage of the host loop 252 bandwidth capability. The communication loop 292 desirably has the same transfer capability as the host loop 252 to allow the system to run at full capacity. In actuality, the communications loop 292 will benefit by having slightly more transfer capability to account for the overhead of other messages (such as the "work load" messages that request the controller actual work load) which are sent between controllers.

In the case of a single controller as depicted in FIG. 1A, it must be capable of processing 6N worth of transfers, whereas in the case of four controllers, the master controller 204 must be capable of handling 3N transfers while each secondary controller 202 only needs to handle 5⁄4N worth of transfers.

The other case to consider is the sequential write situation. With sequential writes, each of N host writes will correspond to N+(1/Y) writes through the disk channel. Y is used to denote the number of data drives in the RAID 5 configuration. If we also assume that a data copy must be made, a single host write N corresponds to (2N)+(1/Y) disk transfers. Again, a single controller with two disk loops, as depicted in FIG. 1A, cannot fully utilize the single host loop 130 bandwidth, whereas in the N-way master/slave controller topology 200 the disk loops 268 can be fully utilized to take advantage of the host loop 252 bandwidth capability.

Figure 3A:
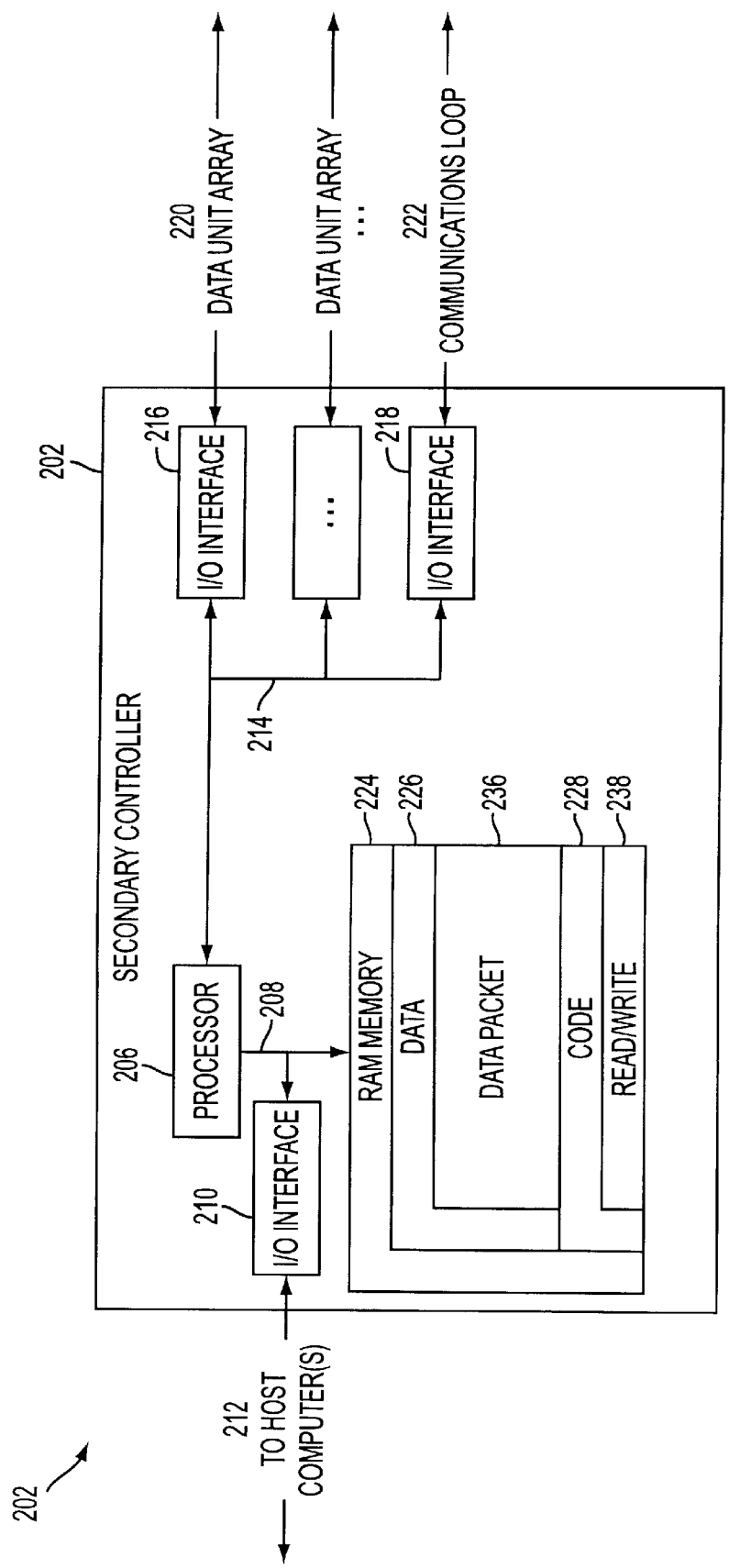
FIG. 3A depicts a secondary controller according to an exemplary embodiment of the invention.

Referring to FIG. 3A, there is shown a block diagram illustrating aspects of an exemplary slave controller 203, according to one embodiment of the present invention. The structure and operation of controller 203 can be used in conjunction with any one of controllers 202-1, 202-3 and 202-4, as illustrated in the embodiments of FIG. 2.

Controller 203 includes a processor 206 that is coupled across a first local bus 208 to I/O interface 210, for bridging between first local bus 208 and first I/O bus 212. The I/O interface is, for example, operatively coupled to the host loop 252. The host loop 252 may, for example, be a hub, a host bus adapter or interconnect types as are known in the art. Processor 203 is also coupled across a second local bus 214 to one or more other I/O interfaces, such as, for example, I/O interfaces 216–218, for bridging between the second local bus 214 and one or more I/O buses 220, and 222. Such I/O interfaces 206, 210, 216 and 218 are known. The I/O interface 218, for example, is operatively coupled to the communications loop 292. The communications loop 292 can be, for example, an optical fiber, copper coax cable, a twisted pair (wire) bus, or other bus or interconnect types as are known in the art.

First and second local buses 208 and 214 can be any type of local bus including, but not limited to, a peripheral component interconnect (PCI) bus, and industry standard architecture (ISA) bus, extended industry standard architecture (EISA) bus, Micro channel architecture, Fiber Channel, SCSI, and the like.

I/O bus 212 is coupled to one or more host computers. I/O buses to 220 and 222 are coupled to one or more peripherals containing one or more data storage devices. Each respective I/O bus 212, 220, and 222 can be, for example, an optical fiber, copper coax cable, a twisted pair (wire) bus, or other bus or interconnect types as are known in the art.

Processor 206 is operatively coupled across first local bus 208 to random access memory (RAM) 224, which may be either internal or external to processor 206. Processor 206 stores data in data 226, and executes procedures stored in code 228 portions of memory 224. For example, processor 206 stores data packets 236 in data 226, and executes read/write procedures 238 in code 228.

In a preferred embodiment, slave controller 203 may be implemented using firmware customization (enhancements) to for example: (a) a DAC960 series of controllers, such as the RAID controller made by Mylex™ of Fremont, Calif.; (b) processor 206 is a 32-bit Intel i960, or a strong ARM RISC microprocessor with multitasking functionality; and, (c) local buses 208 and 214 are PCI buses.

Figure 3B:
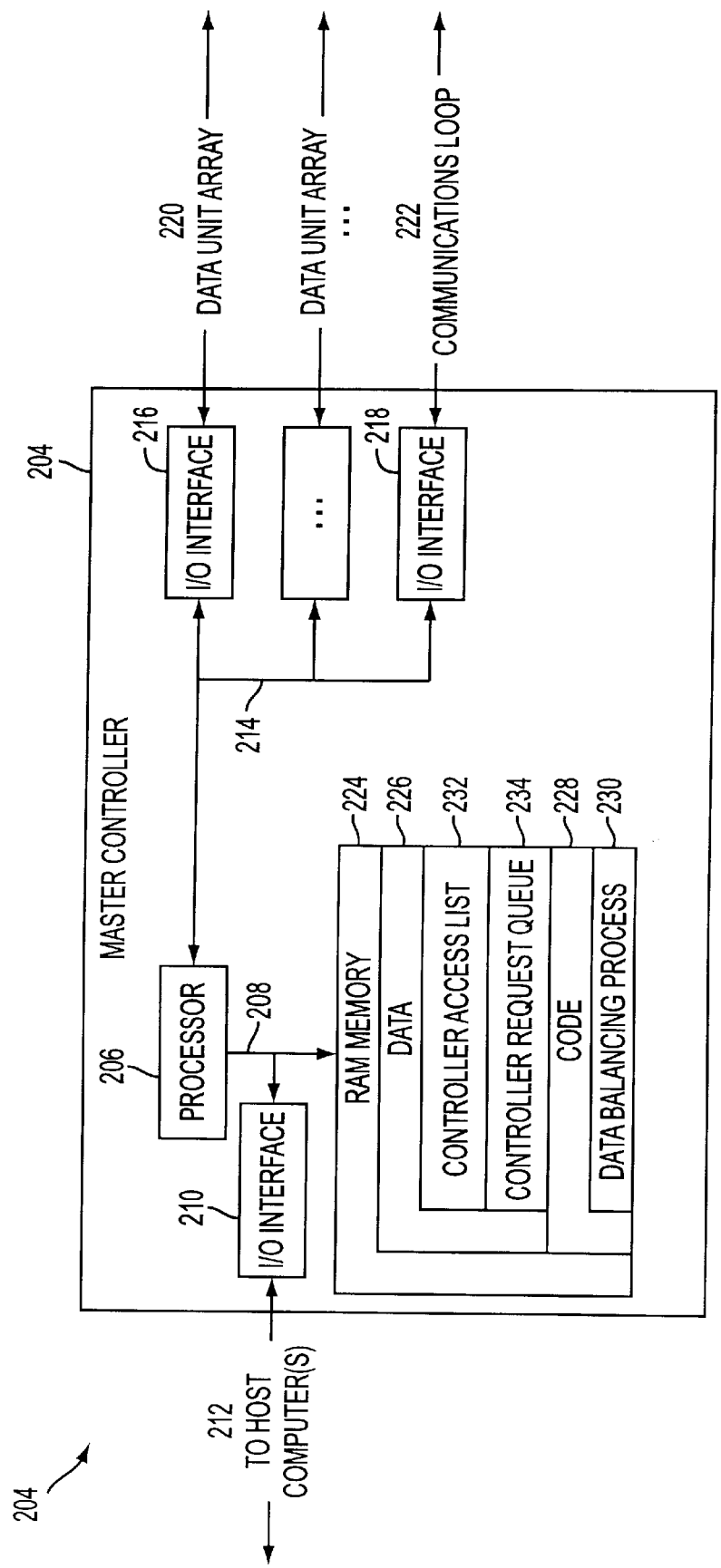
FIG. 3B depicts a master controller according to an exemplary embodiment of the invention.

FIG. 3B depicts the master controller 204 according to an exemplary embodiment of the invention 200. The master controller 204 is similar to the slave controller 203 depicted in FIG. 3A with the exception of the memory 224. The master controller 204 includes the memory 224 defining a data structure 226. The data structure 226 stores a controller assess list 232 and a controller request queue 234. The controller assess list 232 identifies for each controller 202 a list of data units 256 accessible by that controller 202, while the controller request queue 234 includes for each controller 202 a record of all outstanding I/O requests 270. The master controller 204 distributes I/O requests 270 amongst the plurality of controllers 202. Using the controller access list 232 and the controller request queue 234, the mastercontroller 204 identifies a controller, for example 202-1, with the least outstanding I/O requests and assigns an I/O request 270 thereto. By assigning each I/O request 270 to a controller 202-1 with the least outstanding I/O requests, a substantial uniformity or at least partial I/O level balancing in workload amongst the controllers 202 is achieved.

Figure 4:
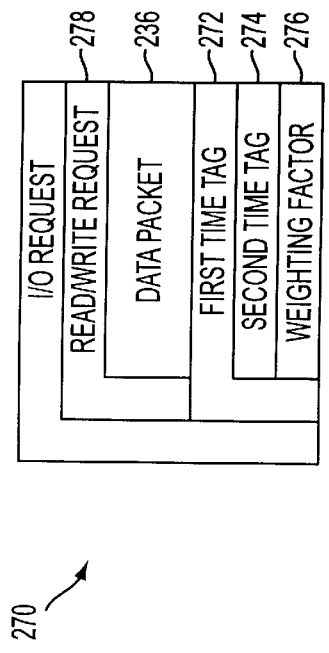
FIG. 4 depicts an I/O request packet according to an exemplary embodiment of the invention.

FIG. 4 depicts an I/O request packet 270 according to an exemplary embodiment of the invention. The I/O request 270 includes a first time tag 272 and a second time tag 274. The first time tag 272 indicates when the I/O request was sent while the second time tag 274 indicates when the I/O request 270 should time out. The first time tag 272 and the second time tag 274 are stored by the master controller 204. Consequently, by using the controller request queue 234, the master controller 204 monitors the first 272 and second 274 time tag of each I/O request 270, thereby enabling the master controller 204 to identify a failed controller. Once a failed controller is identified, the master controller 204 can re-direct any outstanding I/O requests 270 of the failed controller to an active controller. Each I/O request 270 can also include a weighting factor 276 that varies depending on the type of I/O request 270. Using the weighting factor 276 of each I/O request 270, the controller access list 232 and the controller request queue 234, the master controller 204 can distribute I/O requests 270 to achieve a substantial uniformity in workload amongst the plurality of controllers 202. At least a subset of the plurality of controllers 202 are preferable RAID controllers.

A second embodiment of a system is now described with reference to FIG. 5. A data storage system 300 using multiple controllers in a peer-to-peer N-way controller topology is depicted. The data storage system 300 includes a plurality of controllers 302 (302-1, 302-2, 302-3, 302-4). The plurality of controllers 302 are each coupled to a host system 350 via a host loop 352 and operatively coupled to each of a plurality of data unit arrays 354 (354-1, 354-2, 354-3, 354-4). The plurality of data unit arrays 354 each include a plurality disk units 356 (356-1, 356-2, 356-3, 356-4, 356-5) that are linked together via a disk loop 364. The linked disk units 256 appear as a continuous logical unit and each data unit array 354 forms a data span 358; together the plurality of data unit arrays 354 form N-way data spans 360 as described above. Any one active (primary) controller is adapted to transfer data 362 between the data units 356 and the host system 350 in response to instructions therefrom based on a data configuration. In addition, any one active (primary) controller is adapted to balance I/O requests 270 amongst the plurality of controllers 202 and re-direct an I/O request 270 directed to a failed controller to an active controller. Together, the plurality of controllers 302 and the plurality of data unit arrays 354 appears as a continuous system drive 390 to the host system 350.

Figure 5:
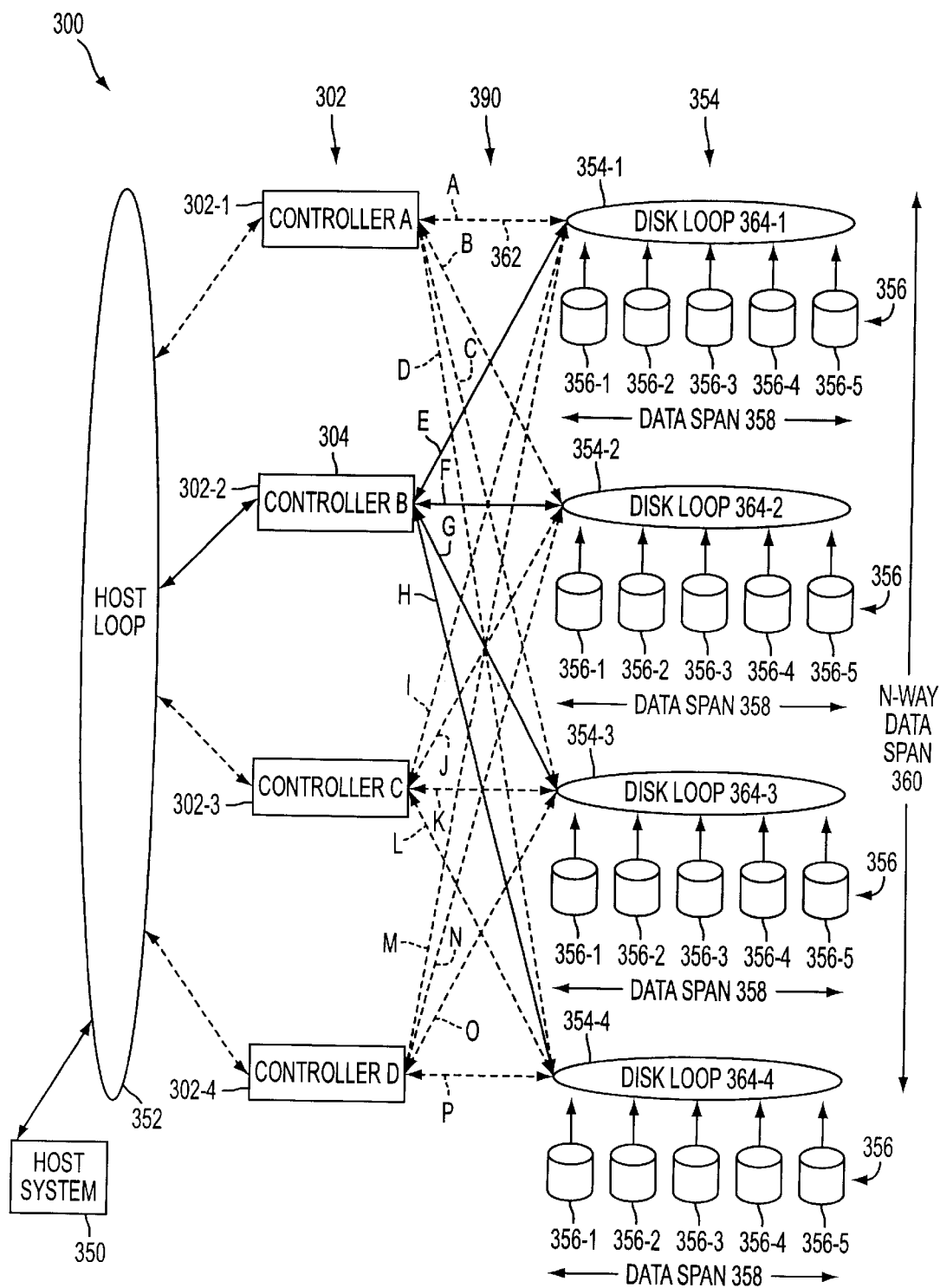
FIG. 5 depicts a data storage system according to a second embodiment of the invention.

In a peer-to-peer N-way controller topology, such as shown in FIG. 5, any one active controller for example 302-2 also has the option of directly reading the data 362 itself. This can be done since each controller 302 has a connection to each of the data unit arrays 354. In addition the topology shown in FIG. 5 has the advantage of allowing any controller 302 in the system to fail without any data loss. If any controller 302 fails, an alternate can simply pick up its data 362 and take over for the failed controller. The linked disk units 256 are preferably linked by a daisy chain connection with the disk loop 364. In addition, each disk unit 256 includes a unit controller 366 and a plurality of data storage devices 368. The data configuration that is preferable a RAID 0+5 configuration.

The peer-to-peer configuration of FIG. 5 is different from the master/slave controller topology in FIG. 2 primarily in that each controller 302 is connected to each data unit array. Usually the peer-to-peer topology is preferable when prevention of data loss is absolutely critical, and the master/slave topology is preferable when a more simplified data storage system with additional processing capability is required.

Figure 6:
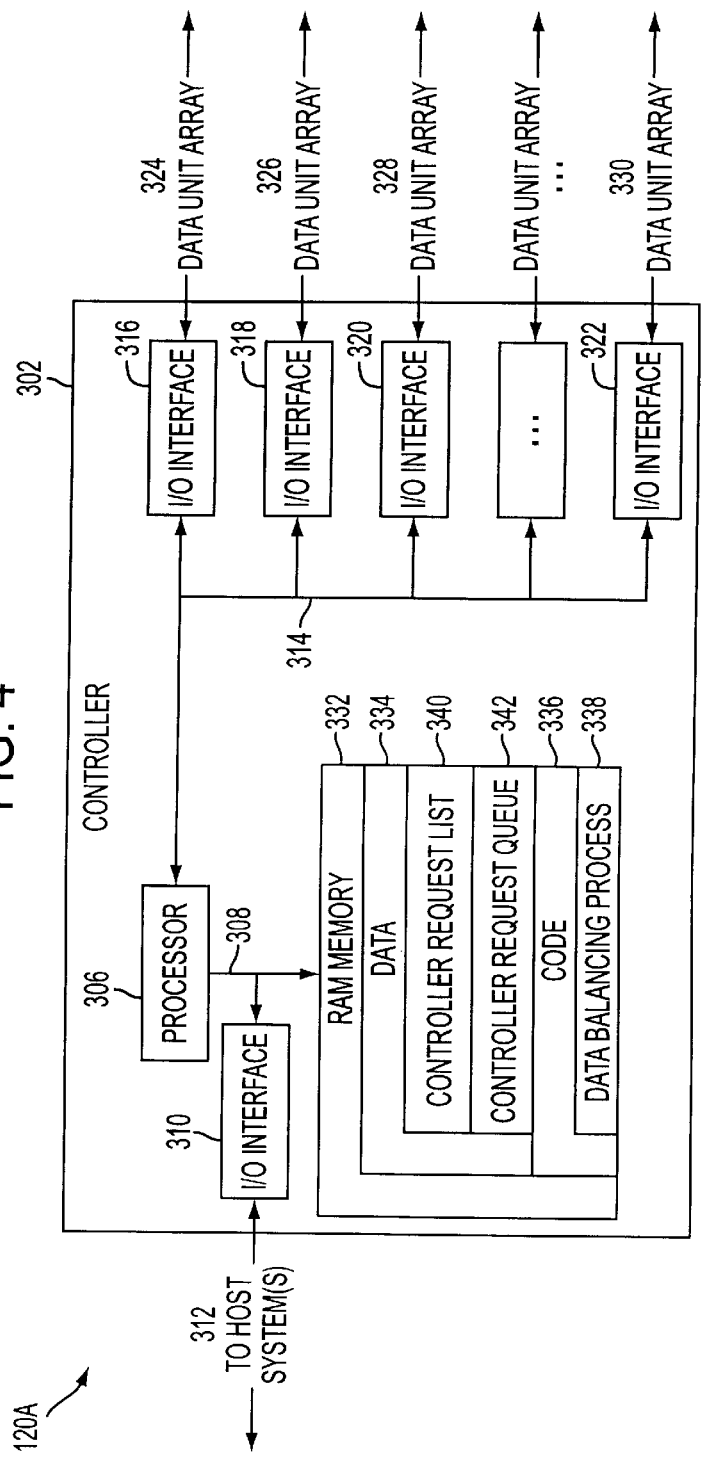
FIG. 6 depicts a controller according to an exemplary embodiment of the invention.

Referring to FIG. 6, there is shown a block diagram illustrating aspects of an exemplary controller 303, according to one embodiment of the present invention. The structure and operation of controller 303 can be used in conjunction with any one of controllers 302-1 to 302-4, as illustrated in the peer-to-peer embodiments of FIG. 5.

Controller 303 includes a processor 306 that is coupled across a first local bus 308 to I/O interface 310, for bridging between first local bus 308 and first I/O bus 312. Processor 306 is also coupled across a second local bus 314 to one or more other I/O interfaces, such as, for example, I/O interfaces 316–322, for bridging between the second local bus 314 and one or more I/O buses 324, 236, 328 and 330. Such I/O interfaces 316–332 are known.

First and second local buses 308 and 314 can be any type of local bus including, but not limited to, a peripheral component interconnect (PCI) bus, and industry standard architecture (ISA) bus, extended industry standard architecture (EISA) bus, Micro channel architecture, Fibre channel, SCSI and the like.

I/O bus 312 is coupled to one or more host computers. I/O buses to 324, 326, 328 and 330 are coupled to one or more peripherals containing one or more data storage devices. Each respective I/O bus 312, 324, 326, 328, and 330 can be, for example, an optical fiber, copper coax cable, or a twisted pair (wire) bus.

Processor 306 is operatively coupled across first local bus 308 to random access memory (RAM) 332, which may be either internal or external to controller 302. Processor 306 stores data in data 334, and executes procedures stored in code 336. For example, processor 306 stores controller access list 340 and request queue 342 in data 326, and executes data balancing procedure 338 in code 300.

To provide a controller 302-1 to 302-4 (see FIG. 5) that is managing a data storage system 300 in an N-way peer-to-peer controller topology the ability to balance I/O requests, each controller 302-1 to 302-4 maintains one or more data structures in memory 332. The data structure stores a controller request queue 342 and a controller request list 340. The request queue 342 includes a record of all outstanding I/O requests 270 for the respective controller. The request list includes a list of all outstanding I/O requests 270 made to other controllers. Using the request queue 342 and the request list 340, a respective controller, for example 302-1, determines a controller, for example 302-2, with the least outstanding I/O requests and assigns the I/O request 270 thereto. By assigning each I/O request to a controller 302-2 with the least outstanding I/O requests, a substantial uniformity in workload amongst the controllers 302 is achieved.

Alternatively, the respective controller 302-1 determines one or more perspective controllers based on a number of outstanding I/O request. An inquiry is then sent to each perspective controller regarding the respective controller's actual number of outstanding I/O requests. A work message may also be broadcast to each perspective controller regarding the respective control's actual number of outstanding I/O requests. Based on a reply to each inquiry or the broadcast message, the respective controller 302-1 determines a controller 302-2 with the least outstanding I/O requests and assigns the I/O request 270 thereto. The I/O 270 request may be assigned by broadcasting a further message directing a chosen controller 302-2 to commit the I/O request 270 and the remaining perspective controllers to discard the work message. By assigning each I/O request 270 to a controller 302-2 with the least outstanding I/O requests, a substantial uniformity in workload amongst the controllers 302 is achieved.

In a preferred embodiment, controller 303 may be implemented using firmware customization (enhancements) to: (a) a DAC960 series of controllers, such as the RAID controller made by Mylex™ of Fremont, Calif.; (b) processor 306 is a 32-bit Intel i960, or a strong ARM RISC microprocessor with multitasking functionality; and, (c) local buses 308 and 314 are PCI buses.

A third embodiment is described with reference to FIG. 6. A data storage system 400 using multiple controllers in a hybrid N-way controller topology configuration is depicted. The data storage system 400 expands on the data storage system 300 as depicted in FIG. 6 to further include a master controller 404 with a plurality of controllers 402 as slave controllers 402. The master controller 404 has a memory 224 defining a data structure 225 (FIG. 3B). The data structure 226 stores the controller request queue 234 that identifies for each slave controller 402 a record of all outstanding I/O requests 270. Using the controller request queue 234, the master controller 404 monitors the first 272 and second 284 time tag of each I/O request 270 (FIG. 4) thereby enabling the master controller 404 to identify a failed controller and re-directs any outstanding I/O requests 270 directed to the failed controller to an active controller. In addition, using the controller request queue 234 and the weighting factor 276 of each I/O request 270 (FIG. 4), the master controller 404 identifies a slave controller, for example 402-2 with the least outstanding I/O requests and assigns the I/O requests 270 thereto, thereby achieving a substantial uniformity in workload amongst the slave controllers 402.

Figure 7:
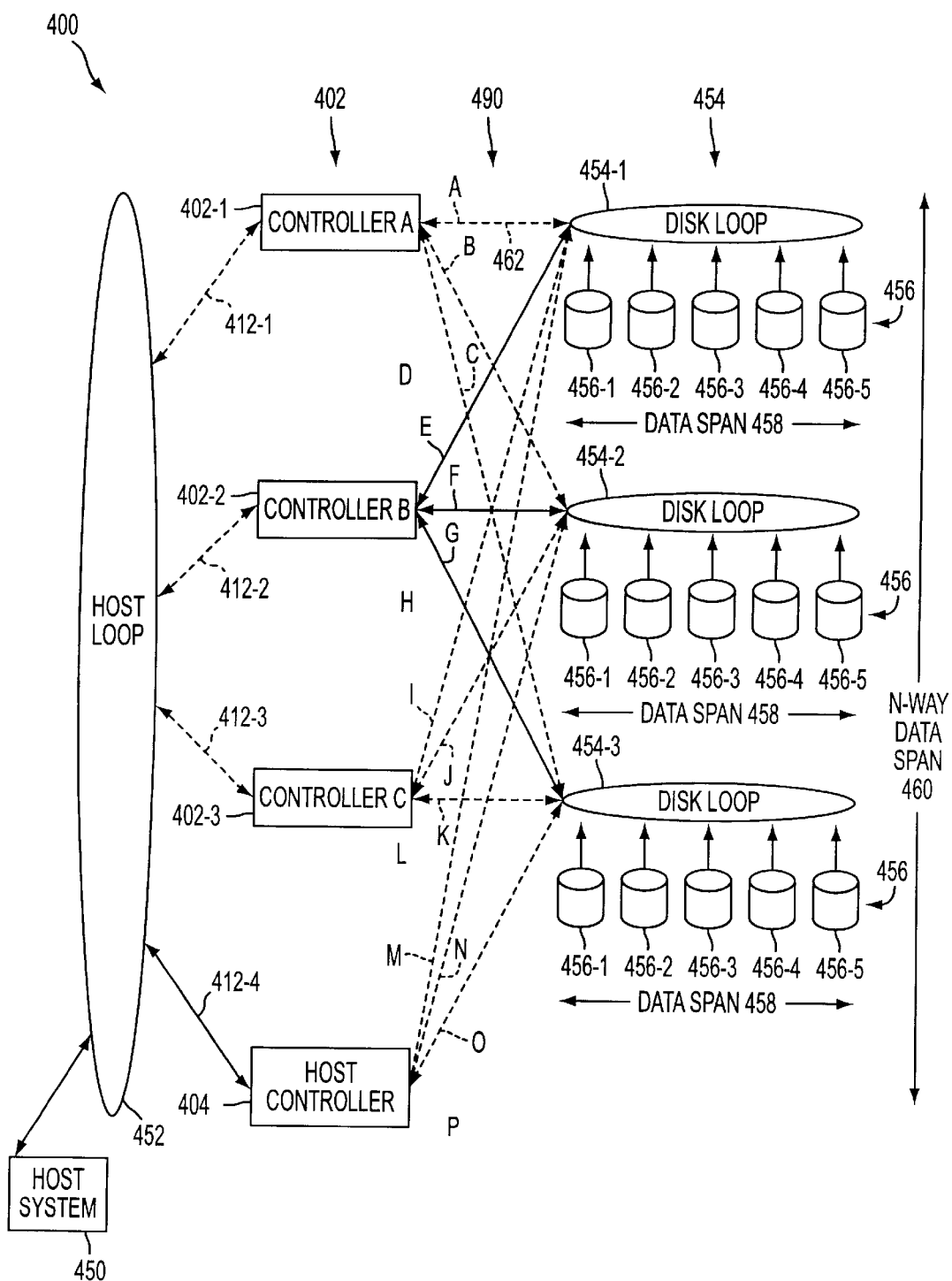
FIG. 7 depicts a data storage system according to a third embodiment of the invention.

FIG. 7 demonstrates a hybrid N-way controller topology 400 in which all the host traffic is sent through the master or host controller 404 with slave controllers 402 used to perform all write operations and available to perform read operations. In the configuration shown in FIG. 7, it would make sense for the host controller 404 to have three times more write cache than what the slave controllers 402 have. This way there is not a problem with accepting host requests due to a limited cache capacity.

The most efficient use of controllers 202, 302 and 402 and disk unit arrays 254, 354 and 454 is probably a hybrid between what is shown in FIG. 2 and FIG. 7. There should be a host controller 404 for standard operations, but it is still worthwhile to have a backup host controller. In addition, instead of all controllers 202, 302 and 402 having access each disk unit array 254, 354 and 454, it is generally sufficient to have two controllers have access to any single disk unit array.

Operation

FIG. 8 depicts an embodiment of a data span creation procedure 500 using a plurality of controllers 202 together with a plurality of data unit array 254 in a data storage system 200 to create N-way data spans, for example, as depicted in FIG. 2. At step 502, each controller 202 is assigned to one of the plurality of data unit arrays 254. At step 504, a span of data is striped across each of the plurality of disk unit arrays in accordance with a data configuration to create N-way data spans. Collectively, the plurality of controllers 202 and the plurality of disk unit arrays 254 appears as a continuous system drive 290 to the host system 250. At step 506, I/O requests 270 are distributed amongst the plurality of controllers 202, by a controller, thereby achieving a substantial uniformity in workload (or at least workload leveling) amongst the plurality of controllers 202. Finally at step 580, a first and second time tag of each I/O request are monitored by a controller, thereby enabling any one active controller to detect a failed controller and re-directs any outstanding I/O requests directed to the failed controller to an active controller.

FIG. 9 depicts alternative procedural method steps 508 for distributing I/O requests 270 amongst the plurality of controllers 202 of step 506, for example, in the data storage system 200, as depicted in FIG. 2. At step 510, a master controller 204 maintains, for each slave controller 202 (202-1, 202-3, 202-4) in the data storage system 200, a controller access list 232 and a controller request queue 234. The controller access list 232 identifies accessible data unit arrays 254 for each slave controller 202 while the controller request queue 234 includes a list of all outstanding I/O requests 270 for each slave controller 202. At step 512, the master controller distributes I/O requests amongst the slave controllers using the controller access list and the controller request queue.

FIG. 10 depicts additional procedural method steps 520 for distributing I/O requests 270 amongst the plurality of controllers 302 of step 506, for example, in the data storage system 300, as depicted in FIG. 5. At step 522, each controller 302 (302-1,302-2, 302-3, 302-4) maintains a request queue 342 that includes a record of all outstanding I/O requests 270 for the respective controller 302. At step 524, each controller 302 maintains a request list 342 of all outstanding I/O requests 270 made to other controllers 302. At step 526, a respective controller, for example 302-2, determines a controller, for example 302-1, with a least number of outstanding I/O requests using the request queue 342 and the request list 340. Finally at step 539, the I/O request 270 is assigned to the controller 302-1 with the least number of outstanding I/O requests, thereby achieving a substantial uniformity in workload amongst the plurality of controllers 302.

FIG. 11 depicts alternative procedural method steps 540 for distributing I/O requests amongst the plurality of controllers 302 of step 506, for example, in the data storage system 300, as depicted in FIG. 5. At step 542, each controller 302 maintains a request queue 572 that includes a record of all outstanding I/O requests 270 for the respective controller. At step 544, each controller 302 maintains a request list 342 of all outstanding I/O requests 270 made to other controllers. At step 546, one or more perspective controllers are determined by a primary controller 302, for example 302-2, using the controller access list 340 and the controller request queue 342. At step 548, the primary controller sends an inquiry to each perspective controller regarding the perspective controllers actual number of outstanding I/O requests. At step 550, the primary controller determines a controller, for example 302-1, with the least outstanding I/O requests as a chosen controller 302-1 based on each received response to the inquiry. Finally at step 552, primary controller assigns the I/O request to the controller 302-1 with the least number of outstanding I/O requests, thereby achieving a substantial uniformity in workload amongst the plurality of controllers 302.

FIG. 12 depicts procedural method steps 560 for distributing I/O requests 270 amongst the plurality of controllers 402 of step 506, for example, in the data storage system 400, as depicted in FIG. 7. At step 562, each controller 202 maintains a request queue 232 that includes a record of all outstanding I/O requests 270 for the respective controller 402. At step 564, each controller maintains a request list of all outstanding I/O requests made to other controllers. At step 566, one or more perspective controllers are determined by a primary controller, for example 402-2, using the controller access list and the controller request queue. At step 568, the primary controller 402-2 broadcasts a work message to each perspective controller regarding the perspective control's actual number of outstanding I/O requests. At step 570, the primary controller 402-2 determines a controller, for example 402-1, with the least outstanding I/O requests as a chosen controller 402-1 based on each received response to the work message. Finally at step 572, the primary controller 402-2 broadcasts a further message directing the chosen controller 402-1 to commit the I/O request 270 and the remaining perspective controllers to discard the work message, thereby achieving a substantial uniformity in workload amongst the plurality of controllers 402.

Figures 13, 14:
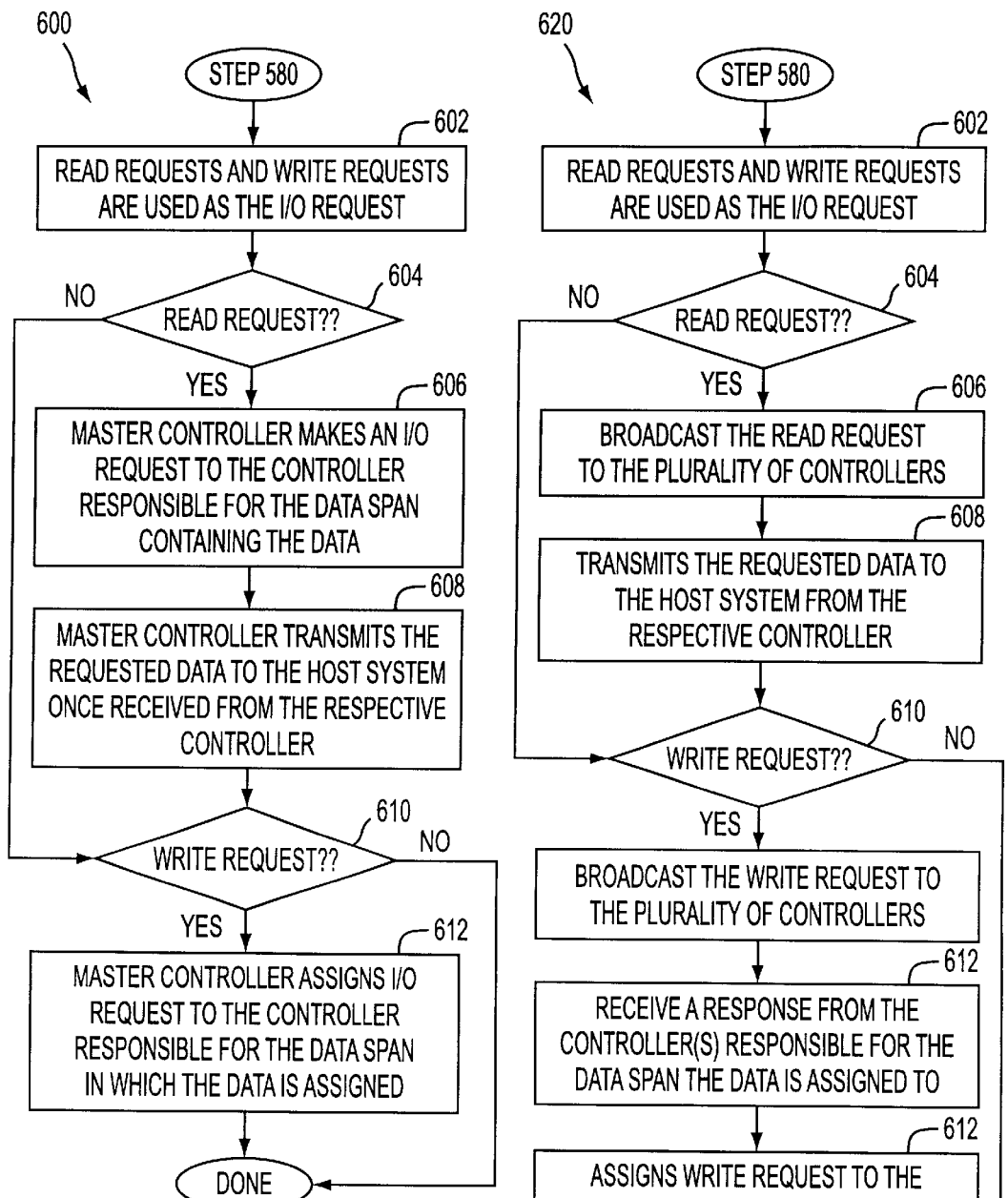
FIG. 13 depicts additional procedural method steps for the data span creation procedure according to a further embodiment of the invention.
FIG. 14 depicts additional procedural method steps for the data span creation procedure according to a further embodiment of the invention.

FIG. 13 depicts additional procedural method steps 500 for the data span 258 creation procedure 500, for example, in the data storage system 200, as depicted in FIG. 2. At step 602, read requests and write requests are used as the I/O request 270. At step 604, when a read request for data 262 is received from the host system 250, at step 606, an I/O request 270 is made to the slave controller(s) 202 (202-1, 202-3, 202-4) responsible for the data span(s) 260 containing the requested data 262 to transfer the requested data 262 to the master controller 204. At step 608, the requested data 262 is transmitted to the host system 250. At step 608, when a write request is received from the host system 250, at step 610, the master controller 204 assigns the write request to the slave controller 202 (202-1, 202-3, 202-4) with the least number of outstanding I/O requests and responsible for a data span 258 in which data 262 is assigned.

FIG. 14 depicts additional procedural method steps 620 for the data span 358 creation procedure 500, for example, in the data storage system 300 and 400, as depicted in FIG. 5 and FIG. 7. At step 622, read requests and write requests are used as the I/O request 270. At step 624, when a read request for data 362 is received from the host system 350, at step 626, the read request is broadcast to the plurality of controllers 302. At step 628, the data 362 is transmitted from the controller(s) 302 responsible for the data span(s) 360 containing the data 362 to the host system 350. At step 630, when a write request for a data packet 362 is received from the host system, at step 632, the write request is broadcast to the plurality of controllers 302. At step 634, a response is received from the controller responsible for the data span 358 to which the data packet 362 is assigned. At step 640, the controller assigned the write request writes the data packet 362 to the data span 358. At step 638, the write request is assigned to controllers 302 responsible for the data span 358 with the least number of outstanding I/O requests.

Exemplary embodiments have been described with reference to specific configurations. Those skilled in the art will appreciate that various changes and modifications can be made while remaining within the scope of the claims.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the data spans while maintaining substantially the same functionality without departing from the scope and spirit of the present invention. In addition, although the preferred embodiment described herein is directed to a data storage system, it will be appreciated by those skilled in the art that the teachings of the present invention can be applied to other data processing systems without departing from the scope and spirit of the present invention. In addition, various configurations of the controllers are possible while still remaining within the scope of the claims.

The invention provides many advantages over known techniques. The present invention include if the spans are setup as a RAID 0+5 or some other similar configuration, the workload is automatically distributed among the various controllers. In addition, there is an automatic copying of the host data to an alternate controller for data protection.

Having disclosed exemplary embodiments and the best mode, modifications and variations may be made to the disclosed embodiments while remaining within the scope of the invention as defined by the following claims.

What is claimed is:

1. A data storage system comprising:
   a plurality of controllers including at least one master controller coupled to a host system via a communications loop; and
   a plurality of data unit arrays, each including a plurality of disk units linked together such that the linked disk units appear as a continuous logical unit and each data unit array forms a data span,
   each controller operatively coupled to one of the plurality of data unit arrays, each controller being adapted to transfer data between the data units and the host system in response to instructions therefrom based on a data configuration, the master controller being adapted to balance I/O requests amongst the plurality of controllers and re-direct an I/O request directed to a failed controller to an active controller, such that the plurality of controllers and the plurality of disk arrays appear as a continuous system drive to the host system.

2. The data storage system of claim 1, wherein each master controller further includes a memory defining a data structure and storing:
   a controller assess list that identifies for each controller a list of data units accessible by that controller, and
   a controller request queue that includes for each controller a record of all outstanding I/O requests;
   the master controller distributing I/O requests amongst the plurality of controllers using the controller access list and the controller request queue to identify a controller with the least outstanding I/O requests and achieve substantial uniformity in workload amongst the controllers.

3. The data storage system of claim 2, wherein each I/O request further includes:
   a first time tag that indicates when the I/O request was sent and a second time tag that indicates when the I/O request should time out, the master controller storing the first time tag and the second time tag, such that using the controller request queue, the master controller monitors the first and second time tag of each I/O request to enable the master controller to identify a failed controller and re-direct any outstanding I/O requests of the failed controller to an active controller.

4. The data storage system of claim 2, wherein each I/O request further includes:
   a weighting factor that varies depending on the type of I/O request, such that using the weighting factor of each I/O request, the controller access list, and the controller request queue, the master controller distributes I/O requests to achieve substantial uniformity in workload amongst the plurality of controllers.

5. The data storage system of claim 1, wherein at least a subset of the plurality of controllers are RAID controllers.

6. The data storage system of claim 1, wherein the linked disk units include disk units linked by a daisy chain connection.

7. The data storage system of claim 1, wherein each disk unit includes a unit controller and a plurality of data storage devices.

8. The data storage system of claim 1, wherein the data configuration is a RAID 0+5 configuration.

9. A data storage system comprising:
   a plurality of controllers, each coupled to a host system via a communications loop; and
   a plurality of data unit arrays each including a plurality disk units linked together such that the linked disk units devices appear as a continuous logical unit and each data unit array forms a data span,
   each controller operatively coupled to each of the plurality of data unit arrays, any one active controller being adapted to transfer data between the data units and the host system in response to instructions therefrom based on a data configuration, and adapted to balance I/O requests amongst the plurality of controllers and re-direct an I/O request directed to a failed controller to an active controller, such that the plurality of controllers and the plurality of data unit arrays appears as a continuous system drive to the host system.

10. The data storage system of claim 9, wherein each controller further includes a memory defining a data structure and storing:
    a request queue that includes a record of all outstanding I/O requests for the respective controller, and
    a request list of all outstanding I/O requests made to other controllers, such that using the request queue and the request list, the respective controller determines a controller with the least outstanding I/O requests and assigns the I/O request thereto, thereby achieving a substantial uniformity in workload amongst the plurality of controllers.

11. The data storage system of claim 9, wherein the each controller further includes a memory defining a data structure and storing:
    a request queue that includes a record of all outstanding I/O requests for the respective controller, and
    a request list of all outstanding I/O requests made to other controllers, such that using the request queue and the request list, the respective controller determines one or more perspective controllers and then sends an inquiry to each perspective controller regarding the respective controller's actual number of outstanding I/O requests to determine a controller with the least outstanding I/O requests and assigns the I/O request thereto, thereby achieving a substantial uniformity in workload amongst the plurality of controllers.

12. The data storage system of claim 9, wherein the each controller further includes a memory defining a data structure and storing:
    a request queue that includes a record of all outstanding I/O requests for the respective controller, and
    a request list of all outstanding I/O requests made to other controllers, such that using the request queue and the request list, the respective controller determines one or more perspective controllers and then broadcasts a work message to each perspective controller regarding the respective control's actual number of outstanding I/O requests to determine a controller with the least outstanding I/O requests as a chosen controller and assigns the I/O request thereto by broadcasting a further message directing the chosen controller to commit the I/O request and the remaining perspective controllers to discard the work message, thereby achieving a substantial uniformity in workload amongst the plurality of controllers.

13. The data storage system of claim 9, wherein each I/O request further includes:
    a first time tag that indicates when the I/O request was sent and a second time tag that indicates when the I/O request should time out, such that using the request list, the plurality of controllers monitor the first and second time tag of each I/O request thereby enabling any one active controller to identify a failed controller and re-direct any outstanding I/O request directed to the failed controller to an active controller.

14. The data storage system of claim 9, further including:
a master controller having a memory defining a data structure and storing a controller request queue that identifies for each controller a record of all outstanding I/O requests; and
wherein each I/O request further includes:
  a first time tag that indicates when the I/O request was sent and a second time tag that indicates when the I/O request should time out, such that using the controller request queue, the master controller monitors the first and second time tag of each I/O request thereby enabling the master controller to identify a failed controller and re-directs any outstanding I/O requests directed to the failed controller to an active controller, and
  a weighting factor that varies depending on the type of I/O request, such that using the controller request queue and the weighting factor of each I/O request, the master controller identifies a controller with the least outstanding I/O requests and assigns the I/O requests thereto, thereby achieving a substantial uniformity in workload amongst the plurality of controllers.

15. The data storage system of claim 14, wherein at least a subset of the plurality of controllers are RAID controllers.

16. The data storage system of claim 9, wherein each disk unit includes a unit controller and a plurality of data storage devices.

17. The data storage system of claim 9, wherein the data configuration is a RAID 0+5 configuration.

18. A method for using a plurality of controllers together with a plurality of data unit arrays in a data storage system to create n-way data spans, the method comprising:
  assigning each controller to one of the plurality of data unit arrays;
  striping a span of data across each of the plurality of disk unit arrays in accordance with a data configuration to create n-way data spans such that the plurality of controllers and the plurality of disk unit arrays appears as a continuous system drive to a host system;
  distributing, by a controller, I/O requests amongst the plurality of controllers in order to achieve a substantial uniformity in workload amongst the plurality of controllers; and
  monitoring, by a controller, a first and second time tag of each I/O request thereby enabling any one active controller to detect a failed controller and re-direct any outstanding I/O requests directed to the failed controller to an active controller.

19. The method of claim 18, wherein the distributing further includes:
  maintaining, by a master controller, for each controller in the data storage system, a controller access list that identifies for each controller accessible data unit arrays and a controller request queue that includes for each controller a list of all outstanding I/O requests; and
  distributing I/O requests using the controller access list and the controller request queue, by the master controller, amongst the plurality of controllers.

20. The method of claim 19, wherein the using further includes:
  using as the I/O request read requests and write requests;
  when a read request for data is received from the host system, requesting the controller(s) responsible for the data span(s) containing the requested data to transfer the requested data to the master controller, and transmitting the requested data to the host system; and
  when a write request is received from the host system, assigning the write request to the controller with the least number of outstanding I/O requests and responsible for a data span in which a data packet is assigned.

21. The method of claim 18, wherein the distributing further includes:
  maintaining, by each controller, a request queue that includes a record of all outstanding I/O requests for the respective controller;
  maintaining, by each controller, a request list of all outstanding I/O requests made to other controllers;
  determining by the respective controller, a controller with a least number of outstanding I/O requests using the request queue and the request list; and
  assigning the I/O request to the controller with the least number of outstanding I/O requests in order to achieve a substantial uniformity in workload amongst the plurality of controllers.

22. The method of claim 21, wherein the maintaining further includes:
  using as the I/O request read requests and write requests;
  when a read request for data is received from the host system, broadcasting the read request to the plurality of controllers, and transmitting the data from the controller(s) responsible for the data span(s) containing the data to the host system; and
  when a write request for a data packet of is received from the host system, broadcasting the write request to the plurality of controllers, receiving a response from the controller responsible for the data span the data packet is assigned to, and writing, by the controller responsible for handling the data span, the data packet to the data span; and
  when multiple controllers are responsible for the data span, assigning the write request to the controller with the least number of outstanding I/O requests.

23. The method of claim 18, wherein the distributing further includes:
  maintaining, by each controller, a request queue that includes a record of all outstanding I/O requests for the respective controller;
  maintaining, by each controller, a request list of all outstanding I/O requests made to other controllers;
  determining one or more perspective controllers using the controller access list and the controller request queue;
  sending an inquiry to each perspective controller regarding the perspective controllers actual number of outstanding I/O requests to determine a controller with the least outstanding I/O requests; and
  assigning the I/O request to the controller with the least number of outstanding I/O requests, thereby achieving a substantial uniformity in workload amongst the plurality of controllers.

24. The method of claim 18, wherein the distributing further includes:
  maintaining, by each controller, a request queue that includes a record of all outstanding I/O requests for the respective controller;
  maintaining, by each controller, a request list of all outstanding I/O requests made to other controllers;
  determining one or more perspective controllers using the controller access list and the controller request queue;
  broadcasting a work message to each perspective controller regarding the perspective control's actual number of outstanding I/O requests;

determining a controller with the least outstanding I/O requests as a chosen controller based on each received response to the work message; and broadcasting a further message directing the chosen controller to commit the I/O request and the remaining perspective controllers to discard the work message, thereby achieving a substantial uniformity in workload amongst the plurality of controllers.

25. The method of claim 18, wherein each of the plurality of controllers is a RAID controller.

26. The method of claim 18, wherein the data configuration is a RAID 0+5 configuration.

27. A controller device, comprising:
a memory defining a data structure and storing:
a controller assess list of data units accessible by the controller device, and
a controller request queue that includes a record of all outstanding I/O request made to any one of a plurality of external controllers;
the controller device configured to receive and distribute I/O requests amongst the plurality of external controllers using the controller access list and the controller request queue to identify a controller with the least outstanding I/O requests to achieve a substantial uniformity in workload amongst the controller and re-direct an I/O request directed to a failed controller to an active controller.

28. The method of claim 27, wherein at least a subset of the plurality of controllers are RAID controller.

29. A method for using a controller device, the method comprising:
storing a controller assess list of data units accessible by the controller device in a memory defining a data structure;
storing a controller request queue that includes a record of all outstanding I/O requests made to any one of a plurality of external controllers;
identifying a controller with the least outstanding number of I/O requests using the controller access list and the controller request queue; and
distributing I/O requests to the controller with the least number of outstanding I/O requests amongst the plurality of external controllers to achieve a substantial uniformity in I/O workload amongst the controller.

30. A computer program product for using a plurality of controllers together with a plurality of data unit arrays in a data storage system to create n-way data spans, the computer program product comprising a computer readable storage medium and a computer program mechanism embedded therein, the computer program mechanism including instructions for:
assigning each controller to one of the plurality of data unit arrays;
striping a span of data across each of the plurality of disk unit arrays in accordance with a data configuration to create n-way data spans such that the plurality of controllers and the plurality of disk unit arrays appears as a continuous system drive to a host system;
distributing I/O requests amongst the plurality of controllers in order to achieve a substantial uniformity in workload amongst the plurality of controllers; and
monitoring, by a controller, a first and second time tag of each I/O request thereby enabling any one active controller to detect a failed controller and re-direct any outstanding I/O requests directed to the failed controller to an active controller.

31. The computer program product of claim 30, wherein the computer program mechanism further includes instructions for:

maintaining for each controller in the data storage system, a controller access list that identifies accessible data unit arrays and a controller request queue that includes for each controller a list of all outstanding I/O requests; and distributing I/O requests amongst the plurality of controllers using the controller access list and the controller request queue.

32. The computer program product of claim 30, wherein the computer program mechanism further includes instructions for:
maintaining a request queue that includes a record of all outstanding I/O requests for each respective controller;
maintaining a request list of all outstanding I/O requests made to other controllers;
determining a controller with a least number of outstanding I/O requests using the request queue and the request list; and
assigning the I/O request to the controller with the least number of outstanding I/O requests in order to achieve a predetermined distribution of I/O workload amongst the plurality of controllers.

33. The computer program product of claim 30, wherein the predetermined distribution of I/O workload comprises a substantially uniform I/O workload distribution.

34. The computer program product of claim 30, wherein the instruction for assigning I/O requests to achieve the predetermined distribution further includes instructions for:
maintaining a request queue that includes a record of all outstanding I/O requests for the respective controller;
maintaining a request list of all outstanding I/O requests made to other controllers;
determining one or more perspective controllers using the controller access list and the controller request queue;
sending an inquiry to each perspective controller regarding the perspective controllers actual number of outstanding I/O requests to determine a controller with the least outstanding I/O requests; and
assigning the I/O request to the controller with the least number of outstanding I/O requests, thereby achieving a substantial uniformity in workload amongst the plurality of controllers.

35. The computer program product of claim 30, wherein the computer program mechanism further includes instructions for:
maintaining, a request queue that includes a record of all outstanding I/O requests for the respective controller;
maintaining, by each controller, a request list of all outstanding I/O requests made to other controllers;
determining one or more perspective controllers using the controller access list and the controller request queue;
broadcasting a work message to each perspective controller regarding the perspective control's actual number of outstanding I/O requests;
determining a controller with the least outstanding I/O requests as a chosen controller based on each received response to the work message; and
broadcasting a further message directing the chosen controller to commit the I/O request and the remaining perspective controllers to discard the work message, thereby achieving a substantial uniformity in workload amongst the plurality of controllers.

* * * * *